3,736,186
SEPARATOR AND ELECTROLYTE MATERIAL FOR SOLID ELECTROLYTE BATTERY SYSTEMS
Charles C. Liang, Andover, Mass., assignor to P. R. Mallory & Co., Inc., Indianapolis, Ind.
No Drawing. Filed June 16, 1971, Ser. No. 153,794
Int. Cl. H01m 11/00
U.S. Cl. 136—83 R         10 Claims

ABSTRACT OF THE DISCLOSURE

A solid electrolyte material comprising an alkali metal halide electrolyte embedded into the pores of molecular sieves and having a conductivity range between $2 \times 10^{-7}$ ohm$^{-1}$ cm.$^{-1}$ and $3 \times 10^{-5}$ ohm$^{-1}$ cm.$^{-1}$ at room temperature.

---

This invention relates to a new kind of solid electrolyte material for use in high voltage solid electrolyte battery systems.

Miniaturization in electronics has been rapidly increasing in recent years and has resulted in increased demand for special power sources characterized by volume and weight comparable to those of electronic components employed in the circuitry. Success in meeting this demand has been achieved by employing solid electrolyte cells. Apart from the advantage of miniaturization, solid electrolyte cells and batteries permit great flexibility in design and possess extremely long shelf-life of the order of five to ten years.

The solid electrolytes employed in solid state cells are ionic conductors which facilitate the ionic flow during the operation of the solid state cells. The ionic conductivity of the solid electrolyte is one of the major factors which determine the performance of any given cell.

It has been found that solid state battery systems may have low conductivity of the solid electrolyte which may result in high internal resistance and low current capability of the solid electrolyte cell.

It is an object of the present invention to provide novel and improved high energy density solid electrolyte cells and batteries having an extremely long shelf life, a large and continuous output of electrical energy for its size, and which may be readily manufactured and sold on a practical and commercial scale at a low cost.

It is another object of the present invention to provide an improved solid electrolyte material being comprised of an alkali metal halide electrolyte incorporated in a molecular sieve substance.

It is a further object of the present invention to provide an improved solid electrolyte battery comprised of an anode, a cathode, and a solid electrolyte being comprised of an alkali metal halide incorporated in a molecular sieve substance.

It is another object of the present invention to provide a solid electrolyte battery comprised of an anode such as the metal lithium or a mixture of the metal lithium and the electrolyte; a cathode such as a mixture of AgI and the metal Ag and the electrolyte or a mixture of PbI$_2$ and the metal Pb and the electrolyte or a mixture of SnI$_2$ and the metal Sn and the electrolyte; and a solid electrolyte such as solid lithium iodide embedded in the pores of a solid crystalline substance such as a zeolite, a faujasite, a chabasite and a cancrinite.

Still another object of the present invention is to provide a primary cell including a solid electrolyte separator.

Another object is to provide a solid electrolyte embedded in a molecular sieve.

Other objects of the invention will become apparent from the following description.

Generally speaking, the present invention provides a new battery system in which the problem of solid electrolyte high internal resistance and low current capability is substantially reduced. This substantial reduction is the direct result of the presence, in the battery, of a novel solid electrolyte material comprised of an alkali metal halide embedded into the pores of a molecular sieve substance.

Void spaces commonly known as cavities, pores, or cages exist in the crystal structures of adsorbent synthetic or natural mineral substances, such as zeolites, faujasites, chabasites, or cancrinites. These types of crystalline minerals, such as zeolites, have the following structural formula:

$$M_{2/n}O \cdot Al_2O_3 \cdot XSiO_2 \cdot YH_2O$$

where M is a cation of $n$ valence; X and Y are independent variables that are a function of the starting mixture composition and the mixture temperature.

Specific examples of zeolite substances are type 13X and type 4A. Type 13X has the structural formula:

$$Na_{86}(AlO_2)_{86}(SiO_1)_{06} \cdot XH_2O$$

where X can be 276 or less; moreover type 13X possesses pores with 11–12 angstrom diameters. Type 4A has the structural formula:

$$Na_{12}((AlO_2)_{12}(SiO_2)_{12}) \cdot XH_2O$$

where X can be 27 or less; moreover type 4A has pores with 3–4 angstrom diameters. The sodium ions in the crystals can be replaced by other metal ions such as lithium, potassium, calcium, etc.

A variety of liquids, gases, vapors, such as water, oxygen, benzene, etc. can be adsorbed in the pores of these crystalline solids. When molecules enter the internal sieve or pore structure, they are held by physical forces of the Van der Waals type.

It has been discovered that solid electrolyte may be introduced into the pores of a molecular sieve to thereby increase the conductivity of the solid electrolyte. Further, it can be argued that the occupation of the pores causes an alteration of the structure of the solid electrolyte and results in a partial "liquification" of the solid electrolyte and increases the mobility of the ions.

EXAMPLE

A LiI in type 13X molecular sieve solid electrolyte was prepared by measuring out twenty milliliters of molten LiI·H$_2$O into a corrosion resistant stainless steel beaker. The molten LiI·H$_2$O was poured into a second corrosion resistant stainless steel beaker containing 7 grams of type 13X molecular sieve. The mixture was then heated at 300° C. for two hours in an argon atmospheric chamber in order to dry the mixture by driving off the water of hydration contained in the lithium iodide and in the 13X molecular sieve. The mixture was then cooled to room temperature in the argon atmospheric chamber at a slow enough cooling rate to prevent thermal spalling or cracking of the final structure.

A test cell was made according to the following system.

| Li | LiI in molecular sieve | AgI plus Ag plus electrolyte.[1] |
|---|---|---|
| Anode | Electrolyte | Cathode. |

[1] 50 weight percent AgI plus 20 wt. percent Ag plus 30 weight percent electrolyte and tested under load, with the open circuit voltage measured to be 2.1 volts at room temperature. The fact that the open circuit voltage of this cell was 2.1 volts is in good agreement with the theoretical thermodynamic value for the Li/AgI system, which shows that the new molecular sieve solid electrolyte is a pure ionic conductor suitable for solid electrolyte cells, because the electrical conductivity of this molecular sieve solid electrolyte is negligible. The conductivity of the new electrolyte at room temperature is about 100 times greater than that of LiI.

The principle of this invention is applicable to solid electrolytes other than lithium halides and includes the other alkali metal halides as well. Also, this invention includes within its scope molecular sieves other than the examples set forth above.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

What is claimed is:

1. A solid electrolyte battery comprising
an anode, said anode comprising an alkali metal;
a cathode; and
a solid electrolyte salt in a molecular sieve substance, said solid electrolyte salt comprising an alkali metal halide.

2. The solid electrolyte battery of claim 1, wherein the alkali metal of the said solid electrolyte salt is the same alkali metal as that forming the anode.

3. The solid electrolyte battery of claim 2, wherein the molecular sieve substance is an adsorbent synthetic or natural solid crystalline mineral material.

4. The solid electrolyte battery of claim 3, wherein the molecular sieve substance is selected from the group consisting of zeolites, faujasites, chabasites, and cancrinites.

5. The solid electrolyte battery of claim 9, wherein the anode is lithium; wherein the alkali metal halide electrolyte is solid LiI embedded into the pores of the molecular sieve substance; and wherein the cathode is a mixture consisting of a heavy metal iodide, the electrolyte which comprises LiI embedded within the molecular sieve substance, and the heavy metal.

6. The solid electrolyte battery of claim 4, wherein the molecular sieve substance is a zeolite.

7. The solid electrolyte battery of claim 5 wherein the cathode is a mixture consisting of AgI, the electrolyte, and the metal Ag.

8. The solid electrolyte battery of claim 5 wherein the cathode is a mixture consisting of $PbI_2$, electrolyte, and the metal Pb.

9. The solid electrolyte battery of claim 5 wherein the cathode is a mixture consisting of CuI, electrolyte, and the metal Cu.

10. The solid electrolyte battery of claim 5 wherein the cathode is a mixture consisting of $SnI_2$, electrolyte, and the metal Sn.

References Cited

UNITED STATES PATENTS

| | | | |
|---|---|---|---|
| 3,186,875 | 6/1965 | Freeman | 136—153 |
| 3,513,027 | 5/1970 | Liang et al. | 136—153 |
| 2,707,199 | 4/1955 | Ruben | 136—153 |
| 3,266,940 | 8/1966 | Caesar | 136—153 |
| 3,462,314 | 8/1969 | Berger et al. | 136—153 |
| 3,519,404 | 7/1970 | Argue et al. | 136—153 |

DONALD L. WALTON, Primary Examiner

U.S. Cl. X.R.

136—153